(12) United States Patent
Li et al.

(10) Patent No.: US 11,011,782 B2
(45) Date of Patent: May 18, 2021

(54) METHODS FOR SELF-HEATING INDUCED HEALING OF METAL DENDRITES

(71) Applicant: RENSSELAER POLYTECHNIC INSTITUTE, Troy, NY (US)

(72) Inventors: Lu Li, Troy, NY (US); Nikhil Koratkar, Clifton Park, NY (US); Swastik Basu, Troy, NY (US); Prateek Hundekar, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 17/042,247

(22) PCT Filed: Mar. 29, 2019

(86) PCT No.: PCT/US2019/024734
§ 371 (c)(1),
(2) Date: Sep. 28, 2020

(87) PCT Pub. No.: WO2019/191530
PCT Pub. Date: Oct. 3, 2019

(65) Prior Publication Data
US 2021/0050628 A1    Feb. 18, 2021

Related U.S. Application Data (60) Provisional application No. 62/824,404, filed on Mar. 27, 2019, provisional application No. 62/649,607, filed on Mar. 29, 2018.

(51) Int. Cl.
| | |
|---|---|
| *H01M 10/42* | (2006.01) |
| *H01M 4/136* | (2010.01) |
| *H01M 4/58* | (2010.01) |
| *H01M 4/525* | (2010.01) |
| *H01M 4/134* | (2010.01) |
| *H01M 4/505* | (2010.01) |
| *H01M 4/38* | (2006.01) |
| *H01M 4/26* | (2006.01) |
| *H01M 4/16* | (2006.01) |
| *H01M 4/139* | (2010.01) |

(52) U.S. Cl.
CPC ....... *H01M 10/4242* (2013.01); *H01M 4/134* (2013.01); *H01M 4/136* (2013.01); *H01M 4/139* (2013.01); *H01M 4/16* (2013.01); *H01M 4/26* (2013.01); *H01M 4/382* (2013.01); *H01M 4/505* (2013.01); *H01M 4/525* (2013.01); *H01M 4/5815* (2013.01)

(58) Field of Classification Search
CPC ...... H01M 4/139; H01M 4/136; H01M 4/134; H01M 4/16; H01M 4/26
See application file for complete search history.

(56) References Cited

U.S. PATENT DOCUMENTS

| | | | | |
|---|---|---|---|---|
| 4,218,521 | A * | 8/1980 | Putt | H01M 10/365 429/508 |
| 5,641,591 | A * | 6/1997 | Kawakami | H01M 4/64 429/231.5 |
| 2002/0064710 | A1 | 5/2002 | Kawakami et al. | |
| 2013/0017432 | A1 * | 1/2013 | Roumi | H01M 2/18 429/145 |
| 2016/0344035 | A1 * | 11/2016 | Zhamu | H01M 12/08 |
| 2017/0200966 | A1 | 7/2017 | Chiang et al. | |
| 2018/0016697 | A1 | 1/2018 | Konopka et al. | |

OTHER PUBLICATIONS

International Search Report and the Written Opinion of the International Searching Authority, International Application No. PCT/US2019/024734, dated Jun. 18, 2019.

Wang, C., et al., "Self-healing chemistry enables the stable operation of silicon microparticle anodes for high-energy lithium-ion batteries," Nature Chemistry, vol. 5, pp. 1042-1048, Dec. 2013.

Zhang, R., et al., "Lithiophilic Sites in Doped Graphene Guide Uniform Lithium Nucleation for Dendrite-Free Lithium Metal Anodes," Angew. Chem. Int. Ed., vol. 56, pp. 7764-7768, May 2017.

* cited by examiner

*Primary Examiner* — Ladan Mohaddes
(74) *Attorney, Agent, or Firm* — Murtha Cullina LLP; Anthony P. Gangemi (57) ABSTRACT

A method of prolonging service life of an energy storage device such as a lithium-ion battery includes temporarily operating the battery at an elevated current density. Cycling of lithium-ion batteries at regular current densities results in the generation of lithium-metal dendrites at the surface of the anode, particularly in batteries where the anode is lithium metal. The lithium metal dendrites pose a threat to damage other components of the battery, such as separators, as well as causing an electrical short. Operating the battery in bursts at the elevated current density results in self-heating at the anode surface that merges adjacent lithium-metal dendrites and an overall smoothing of the anode surface. This method is also applicable to other alkali-metal-based batteries and chemistries.

20 Claims, 8 Drawing Sheets

METHODS FOR SELF-HEATING INDUCED HEALING OF METAL DENDRITES

CROSS REFERENCE TO RELATED APPLICATION(S)

This application claims the benefit of U.S. Provisional Application Nos. 62/824,404, filed Mar. 27, 2019, and 62/649,607, filed Mar. 29, 2018, which are incorporated by reference as if disclosed herein in their entireties.

STATEMENT REGARDING FEDERALLY SPONSORED RESEARCH OR DEVELOPMENT

This invention was made with government support under grant nos. 1435783, 1510828, and 1608171 awarded by the National Science Foundation. The government has certain rights in the invention.

BACKGROUND

The advent of Li-ion batteries has enabled the development of portable electronics, and the emergence of electric vehicles has led to a paradigm shift in the automotive industry. However, even state-of-the-art Li-ion cells can reach a specific energy of only ~250 Wh $kg^{-1}$, which is an order of magnitude lower than the practical value of gasoline. Traditionally, Li-ion batteries are based on the rocking chair concept, where Li ions are shuttled between electrodes that behave as hosts for the ions during charge and discharge. Such a system has proved to be successful but limiting to the energy density.

The demand for higher energy density battery systems has created a renewed interest in the exploration of metallic lithium (Li) as an anode material. This is because the packing density of Li atoms is the highest in its metallic form resulting in an ultra-high theoretical specific capacity of 3,860 mAh $g^{-1}$ and the lowest electrochemical potential (−3.04 vs. the standard hydrogen electrode) amongst other candidates makes it the ideal choice as an anode in a Li-ion battery. However, the main stumbling block to deployment of Li metal anodes is the nucleation and growth of 'dendritic' projections during the electrochemical plating/stripping process that occurs when the battery is being charged/discharged. These Li dendrites are problematic in many respects. Dendritic growth of Li is considered to be responsible for increase in irreversible capacity loss, reduction of coulombic efficiency (CE) as well as degradation/drying of the electrolyte. In fact, these dendritic projections are also capable of piercing through the battery separator and electrically shorting the battery. This can result in a severe thermal runaway, and the organic electrolyte being highly flammable could catch fire, which represents an unacceptable safety hazard.

Researchers have over the years devised various approaches to control and suppress the growth of Li dendrites, but 100% suppression has proved challenging. This is because kinetically, the nucleation and growth of Li dendrites is highly favorable during electrochemical plating and stripping reactions.

SUMMARY

Some embodiments of the present disclosure are directed to a method of prolonging service life of an energy storage device including providing an energy storage device, wherein the energy storage device including an anode and a cathode, cycling the energy storage device at an operating current density, operating the energy storage device at a healing current density to generate heat, the healing current density being greater the operating current density, smoothing one or more dendrites on a surface of the anode via the heat, and returning the energy storage device to cycling at the operating current density. In some embodiments, the operating current density is below about 4.5 mA $cm^{-2}$, and the healing current density is above about 4.5 mA $cm^{-2}$, above about 9 mA $cm^{-2}$, or above about 12 mA $cm^{-2}$.

In some embodiments, the energy storage device is operated at the healing current density to generate heat for a duration greater than about 1 hour. In some embodiments, the energy storage device is operated at the healing current density to generate heat for a duration between about 2 hours and about 3 hours.

In some embodiments, the anode is a metal anode. In some embodiments, the metal anode is composed of an alkali metal. In some embodiments, the alkali metal is lithium, sodium, potassium, or combinations thereof. In some embodiments, the cathode is an alkali metal oxide composite cathode or a carbon-sulfur composite cathode. In some embodiments, the alkali metal oxide composite cathode is an alkali-metal-iron-phosphate composite cathode, alkali-metal-cobalt-oxide composite cathode, alkali-metal-manganese-oxide composite cathode, alkali-metal-nickel-manganese-cobalt composite cathode, alkali-metal-nickel-cobalt-aluminum-oxide composite cathode, alkali-metal-titanate composite cathode, or combinations thereof.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
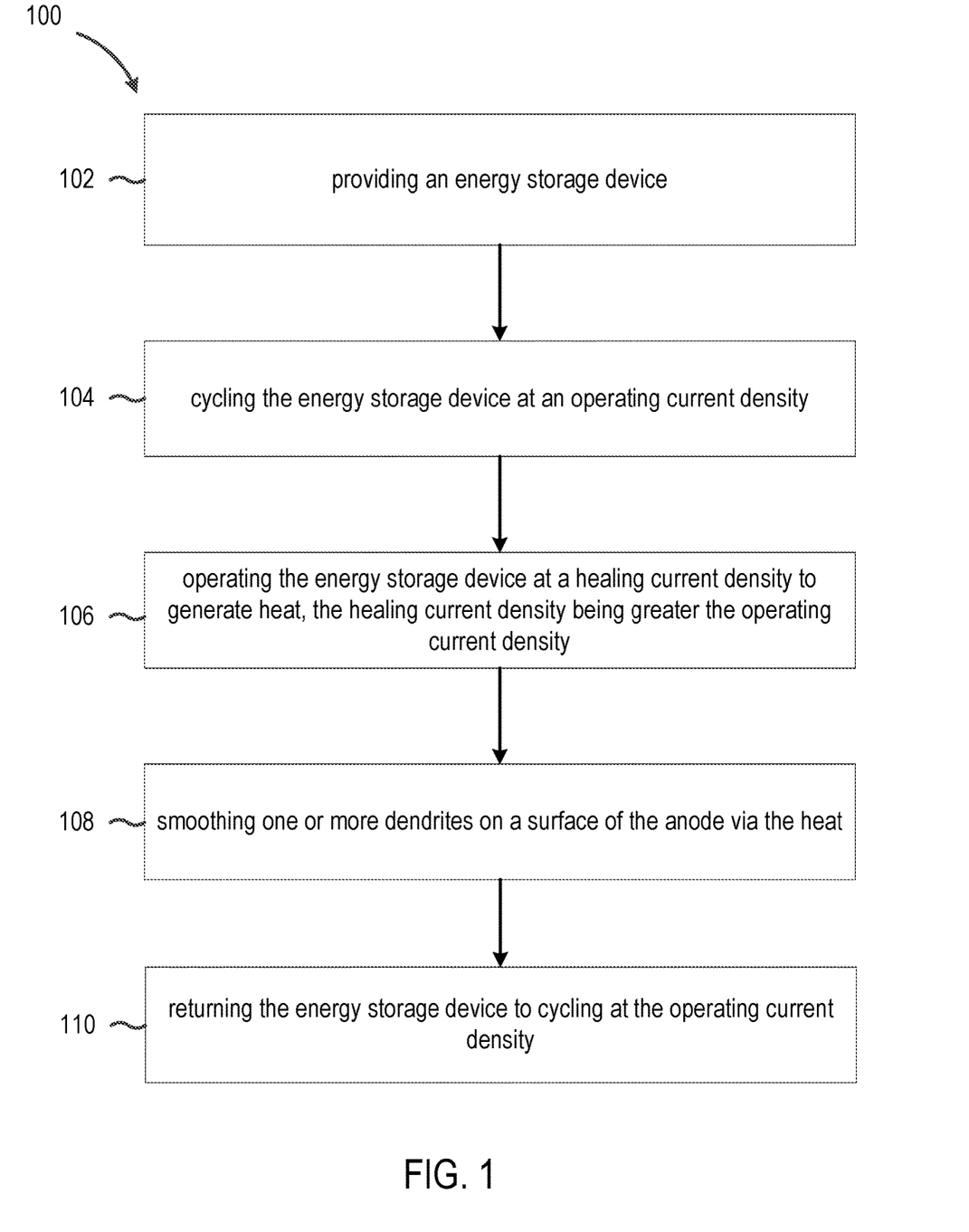
FIG. 1 is a chart of a method for prolonging service life of an energy storage device via self-heating induced healing of metal dendrites according to some embodiments of the present disclosure.

Referring now to FIG. 1, some aspects of the disclosed subject matter include a method 100 of prolonging service life of an energy storage device, e.g., a rechargeable battery. At 102, an energy storage device is provided. The energy storage device is rechargeable and includes one or more anodes, one or more cathodes, electrolyte suitable for use with the one or more anode and one or more cathodes, and any other components, e.g., a separator, for successful operation as an energy storage for a specific use. Service life of the energy storage device is prolonged via surface healing of the anode via self-heating, as will be discussed in greater detail below. In some embodiments, the anode is composed of one or more metals. In some embodiments, the anode is composed of an alkali metal. In some embodiments, the alkali metal is lithium, sodium, potassium, or combinations thereof. In some embodiments, the cathode is composed of a suitable material for use with the anode as described above. In some embodiments, the cathode is an alkali metal oxide composite cathode or a carbon-sulfur composite cathode. In some embodiments, the alkali metal oxide composite cathode is an alkali-metal-iron-phosphate composite cathode, e.g., $LiFePO_4$; alkali-metal-cobalt-oxide composite cathode, e.g., $LiCoO_2$; alkali-metal-manganese-oxide composite cathode, e.g., $LiMn_2O_4$; alkali-metal-nickel-manganese-cobalt composite cathode, e.g., $LiNiMnCoO_2$; alkali-metal-nickel-cobalt-aluminum-oxide composite cathode, e.g., $LiNiCoAlO_2$; alkali-metal-titanate composite cathode, e.g., $Li_4Ti_5O_{12}$, or combinations thereof.

At 104, the energy storage device is operated at an operating current density. In some embodiments, operating 104 the energy storage device includes cycling, e.g., alternatingly discharging and charging the device, at an operating current density. As used herein, the term "operating current density" refers to the "standard" current density at which the energy storage device operates, i.e., at a value selected to optimize performance and durability for a specific purpose, e.g., use in a consumer electronic device meant to remain in service for many years. In some embodiments, the operating current density of the energy storage device is below about 5 mA $cm^{-2}$. In some embodiments, the operating current density of the energy storage device is below about 4.5 mA $cm^{-2}$. In some embodiments, the operating current density of the energy storage device is below about 1 mA $cm^{-2}$. In some embodiments, the operating current density of the energy storage device is about 0.75 mA $cm^{-2}$. In some embodiments, the operating current density of the energy storage device is about 0.5 mA $cm^{-2}$.

At 106, the energy storage device is operated at a healing current density. The healing current density is greater the operating current density. Conventional wisdom dictates that by operating the energy storage device at the elevated healing current density, growth of potentially harmful metal dendrites at the surface of the anode will accelerate. These dendrites can be sharp and pose a threat to pierce through components of the energy storage device, such as a separator, and cause an electrical short. However, sufficient increase in the current density during operation of the energy storage device also produces heat and induces significant self-heating of the energy storage device, including the surface of the anode and the dendrites disposed thereon. In some embodiments, the healing current density remains at a safe level, i.e., below the level at which the electrolyte might break down or at which thermal damage is done to components of the energy storage device. In some embodiments, the healing current density is above about 4.5 mA $cm^{-2}$. In some embodiments, the healing current density is above about 5 mA $cm^{-2}$. In some embodiments, the healing current density is above about 9 mA $cm^{-2}$. In some embodiments, the healing current density is above about 12 mA $cm^{-2}$. In some embodiments, the healing current density is above about 15 mA $cm^{-2}$. In some embodiments, operating the energy storage device at the healing current density includes charging the energy storage device at the healing current density, discharging the energy storage device at the healing current density, or combinations thereof. In some embodiments, the energy storage device is operated 106 at the healing current density for a duration. In some embodiments, the duration is greater than about 1 hour. In some embodiments, the duration is between about 2 hours and about 3 hours. In some embodiments, the duration is greater than about 5 hours. In some embodiments, the healing current density is the average current density at which the energy storage device is operated for the duration of step 106. In some embodiments, the energy storage device is alternatingly charged and discharged during self-heating step 106.

Figure 2A:
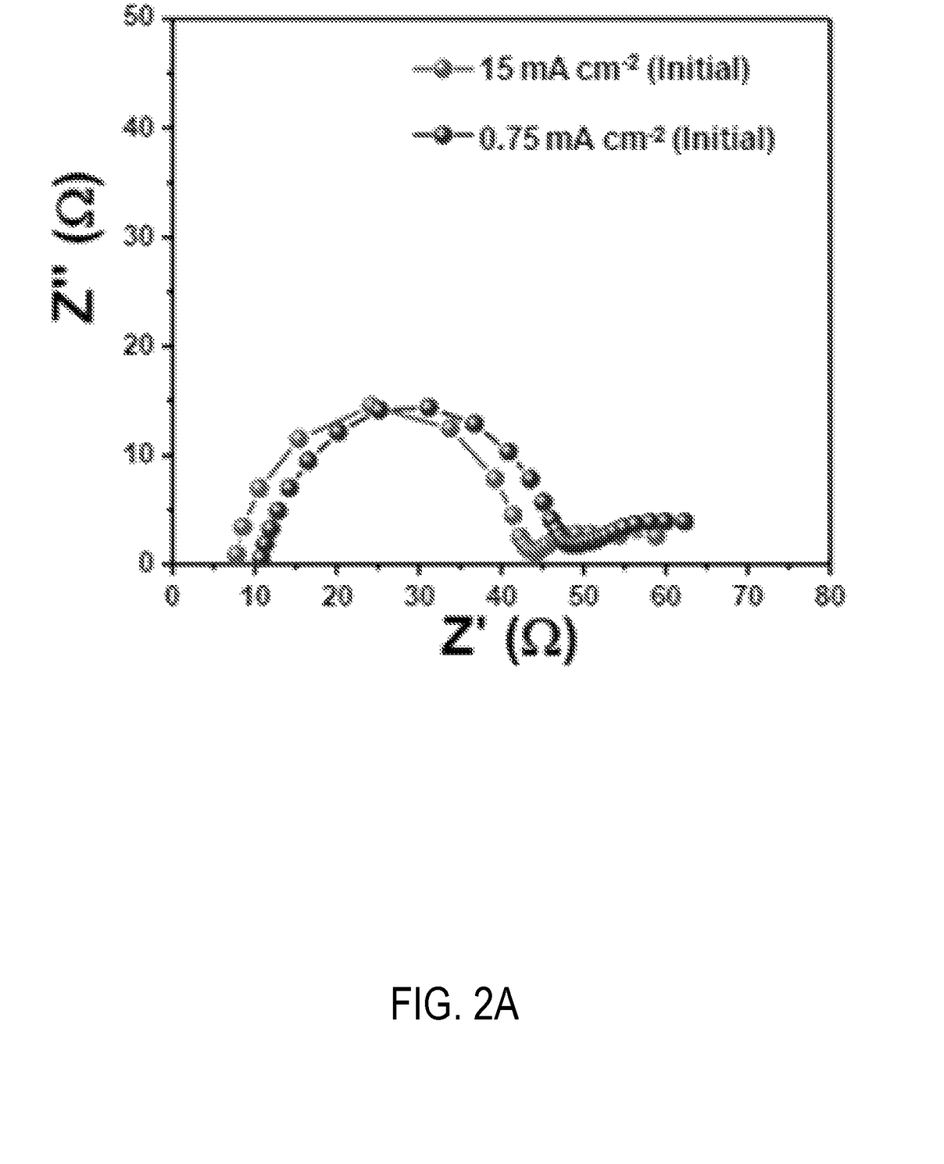
FIGS. 2A and 2B portray electrochemical impedance spectra of energy storage devices showing the effectiveness of the methods for prolonging service life of an energy storage device via self-heating induced healing of metal dendrites according to some embodiments of the present disclosure.
Figure 2B:
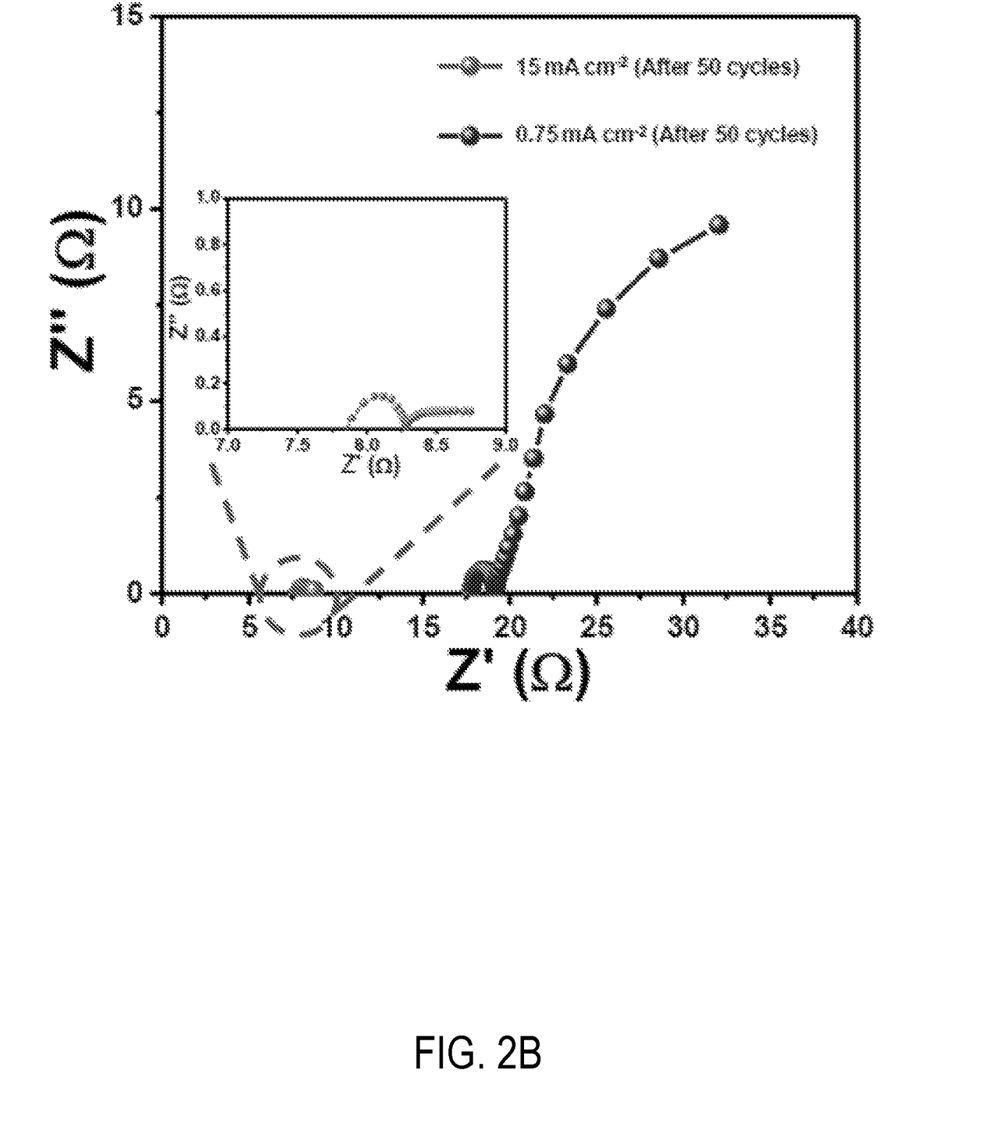

At 108, one or more dendrites on a surface of the anode are smoothed via the heat evolved in self-heating step 106. Without wishing to be bound by theory, the self-heating step 106 promotes diffusion of atoms, e.g., lithium metal atoms, from the metal dendrites, leading to healing of the dendritic surface by fusing together adjacent dendrites and a smoother surface. Referring now to FIGS. 2A and 2B, electrolyte resistance testing was performed over a range of current densities from about 0.75 mA $cm^{-2}$ to about 15 mA $cm^{-2}$. Initial tests are shown in FIG. 2A while tests performed after 50 cycles are shown in FIG. 2B. Electrolyte resistance of the device cycled at about 15 mA $cm^{-2}$ remained at about 8Ω both before and after 50 cycles, while the corresponding resistance of the device cycled at about 0.75 mA $cm^{-2}$ increased by about 75% in the same number of cycles. Such a rapid increase in electrolyte resistance is a signature of dendritic growth.

Figure 3:
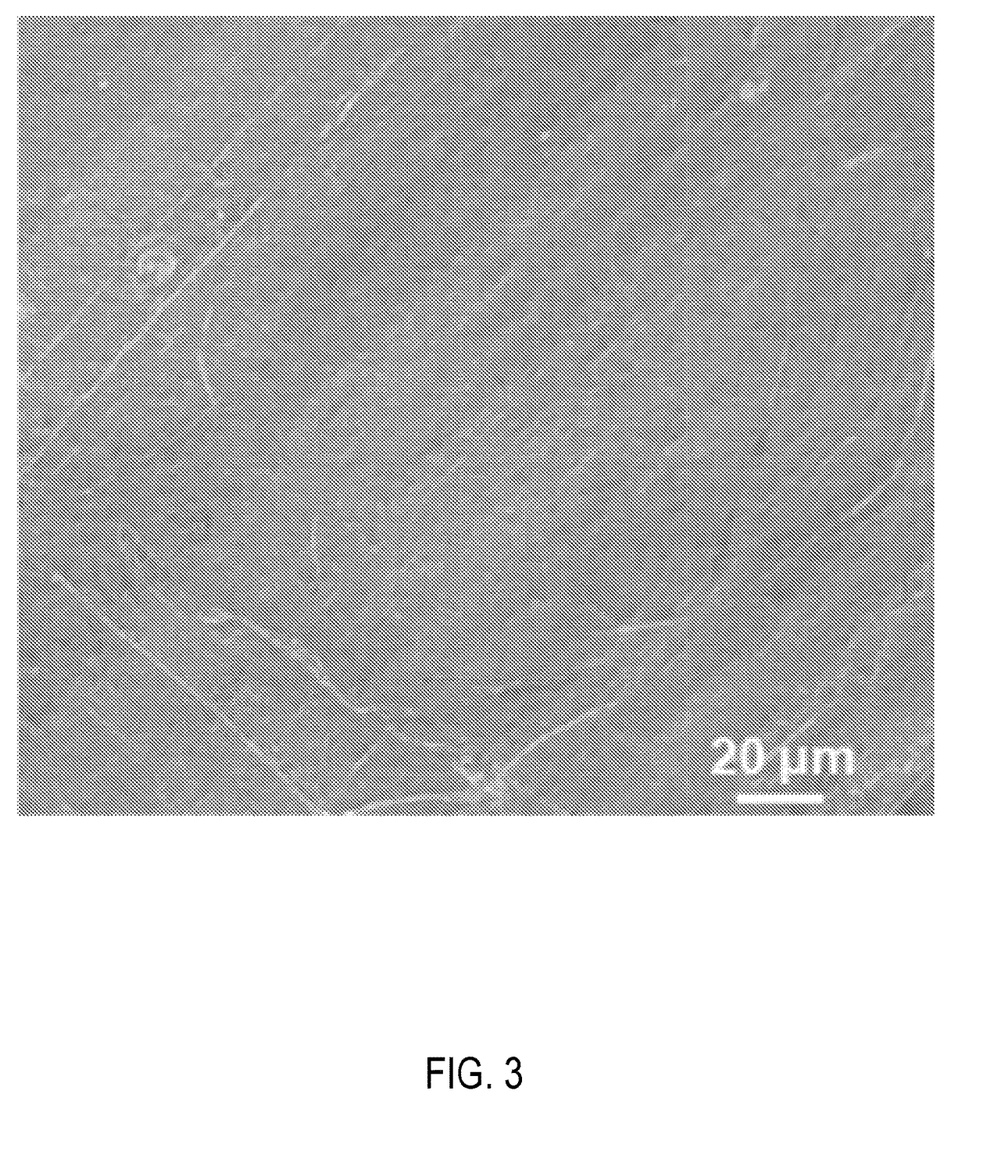
FIG. 3 portray a scanning electron microscopy image of a pristine metal foil surface.
Figure 4A:
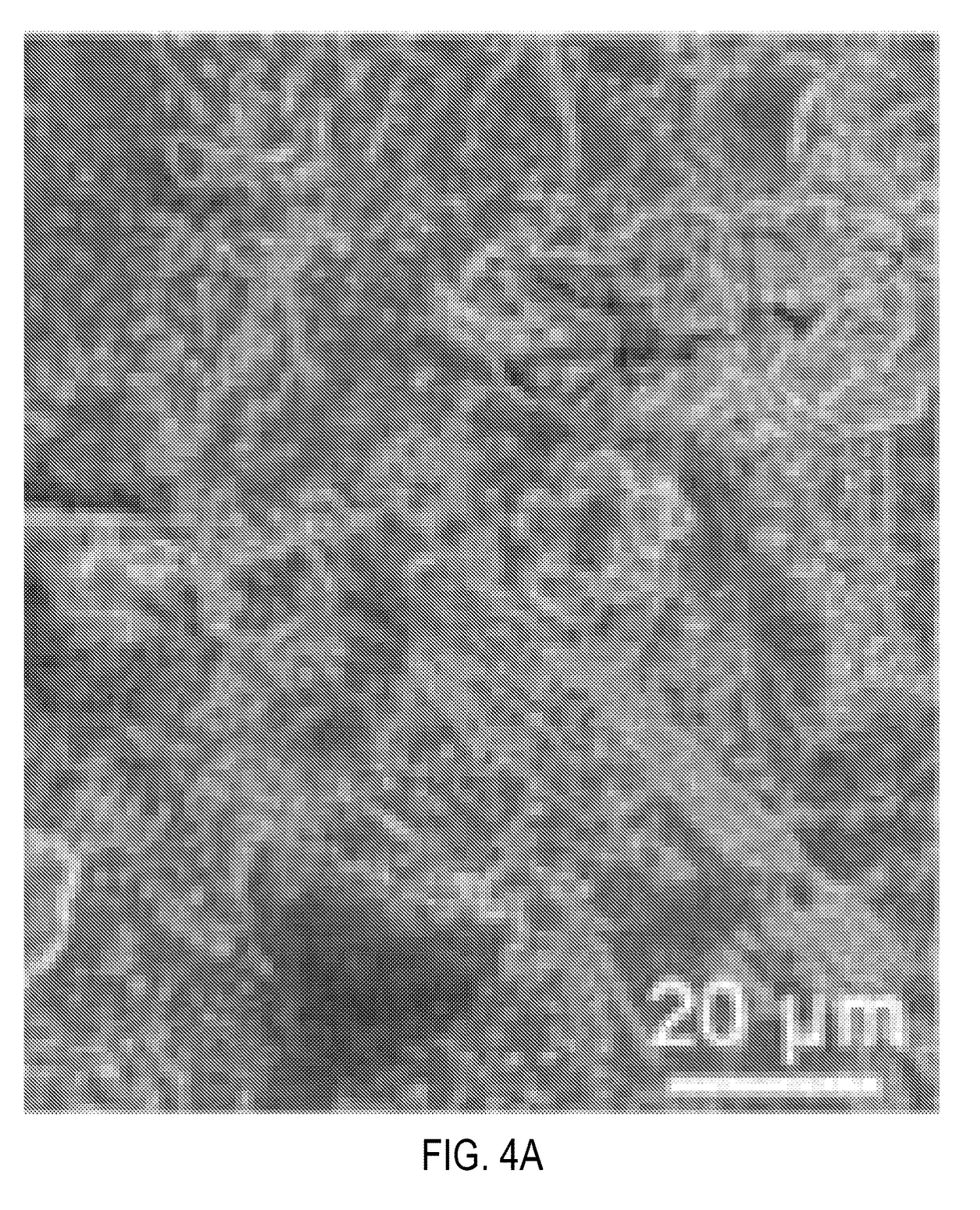
FIGS. 4A and 4B portray scanning electron microscopy images showing healing of metal dendrites via self-heating induced healing of metal dendrites according to some embodiments of the present disclosure.
Figure 4B:
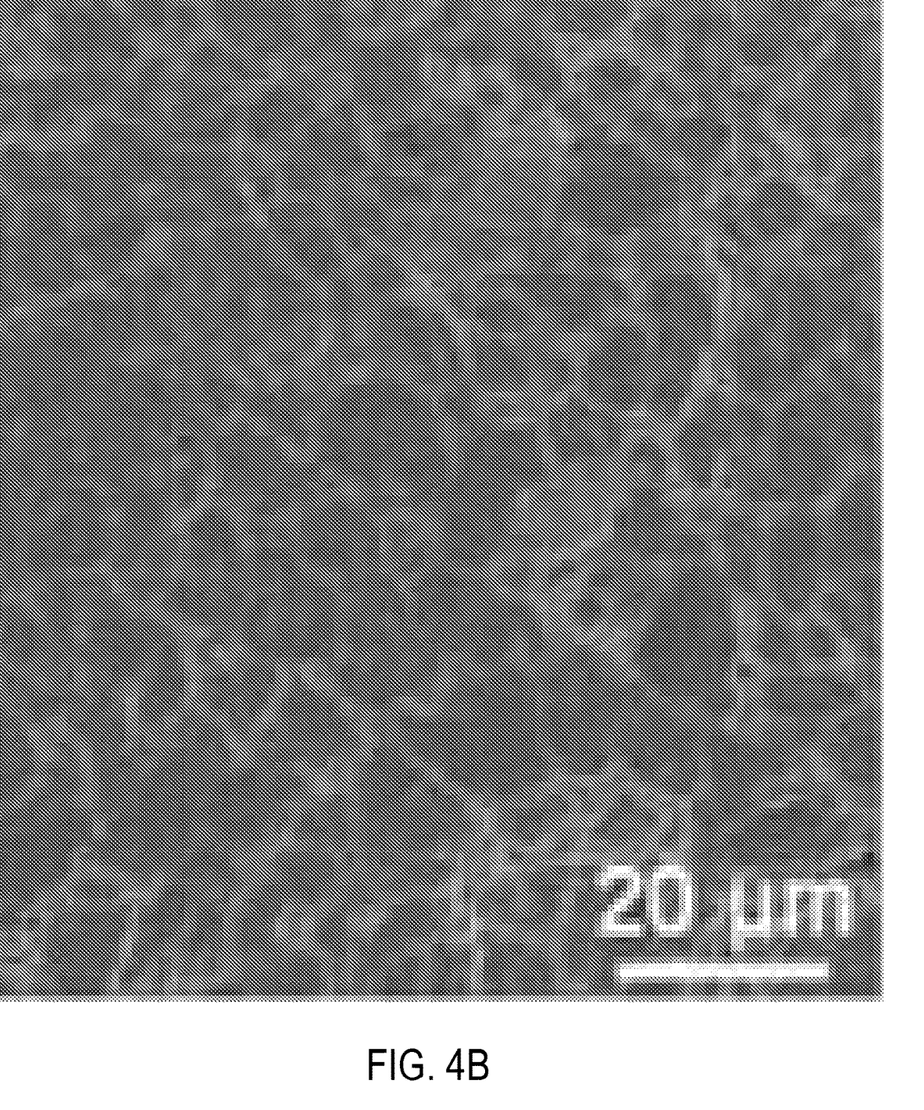

Referring now to FIGS. 3 and 4A-4B, scanning electron microscopy (SEM) imaging of the anodes was performed to corroborate the results shown in FIG. 2. At FIG. 3, an SEM image of the surface of an uncycled anode is shown. At FIGS. 4A-4B, SEM images of the surface of the 0.75 mA $cm^{-2}$ (FIG. 4A) and 15 mA $cm^{-2}$ (FIG. 4B) cycled anodes are shown. Under the lower current density, a few isolated but large diameter dendritic particles can be observed. With the increase in current density, however, the dendrites fuse (merge) together, the consequence being the smoother surface shown in FIG. 4B that is much less likely to damage other components of the energy storage device or cause an electrical short.

Figure 5A:
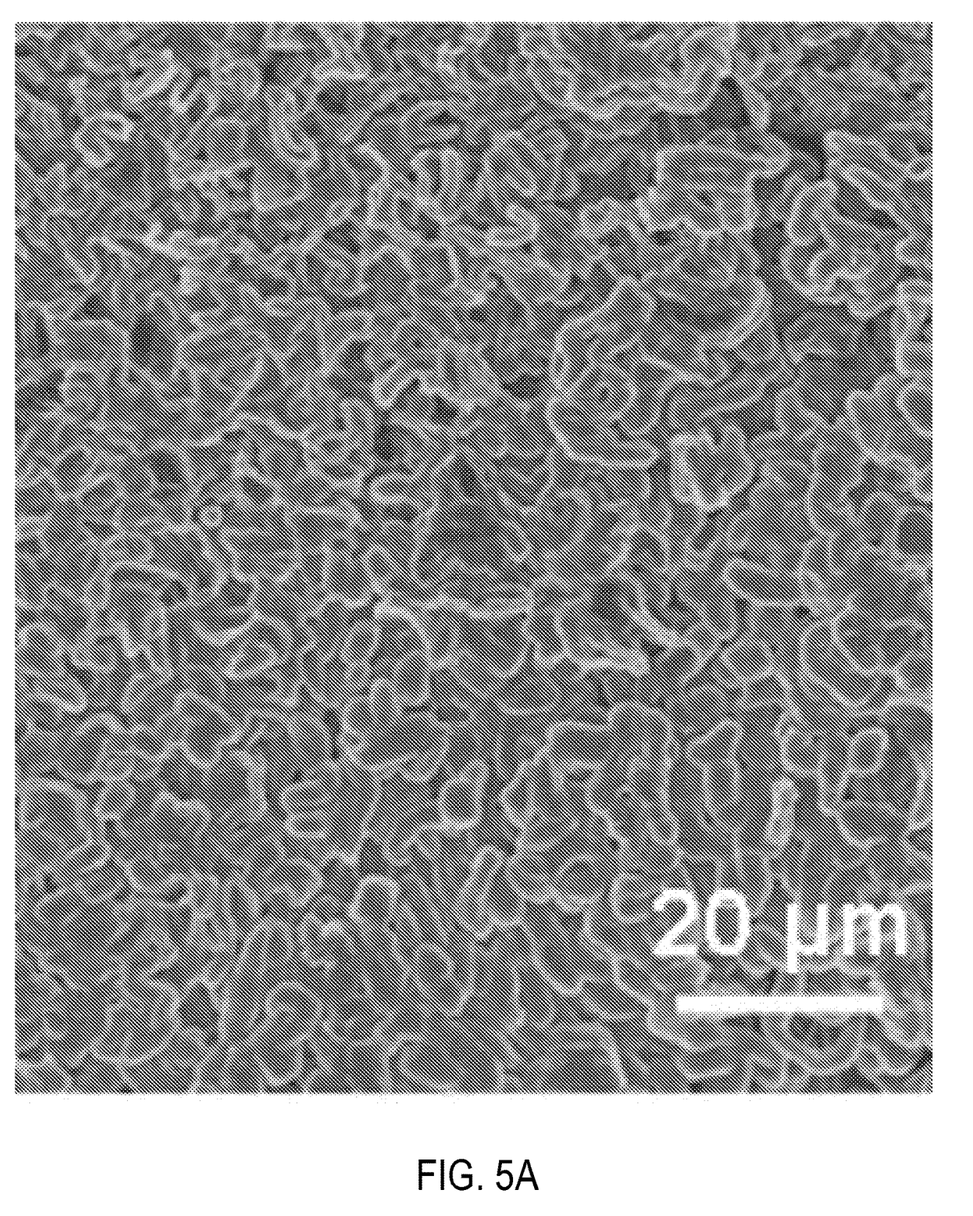
FIGS. 5A and 5B portray scanning electron microscopy images showing healing of metal dendrites via thermal annealing.
Figure 5B:
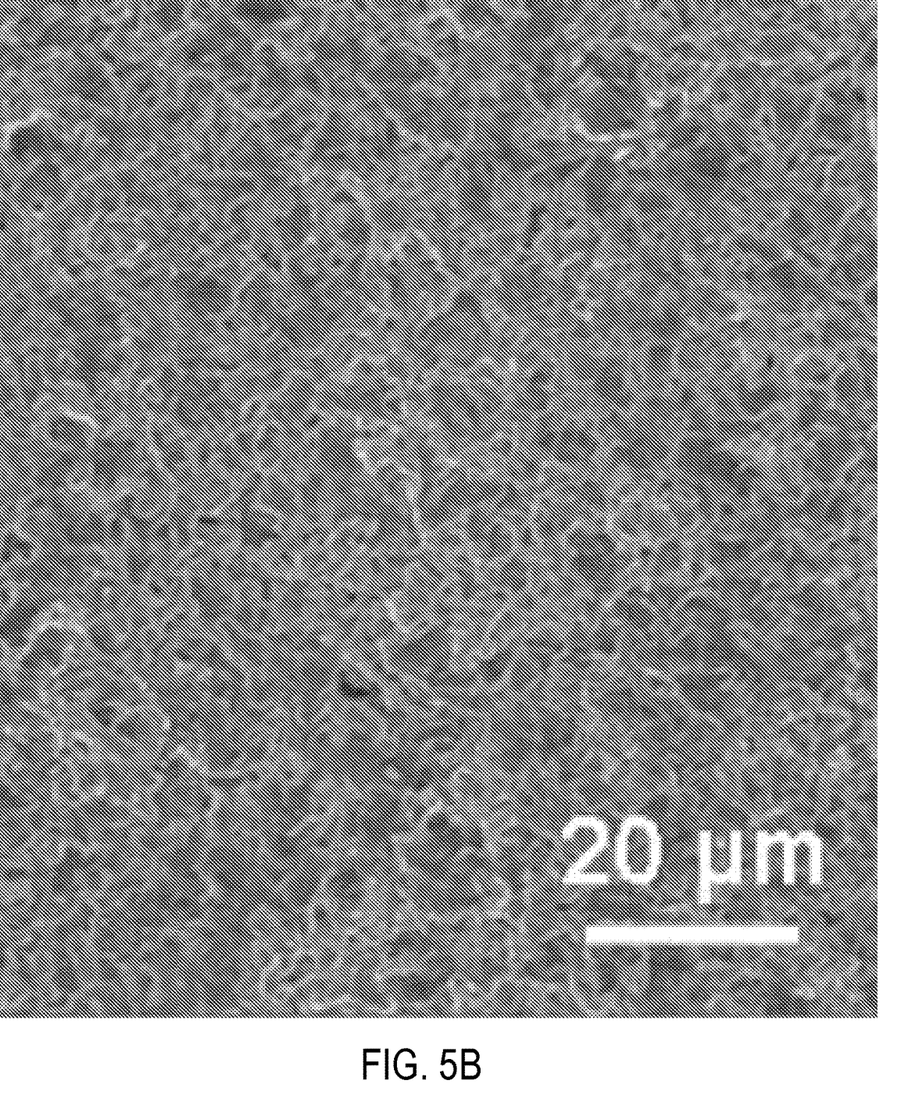

Referring now to FIGS. 5A-5B, to confirm that the healing is a thermal effect, a dendrite annealing control experiment was performed. In this test, the energy storage devices were cycled at a current density of ~4.5 mA $cm^{-2}$ for 50 charge-discharge cycles. Then the cell was thermally annealed at a temperature of ~70° C. for ~3 days. FIGS. 5A and 5B show SEM images of the Li metal electrode pre- and post-annealing respectively. The annealed device displays a relatively smooth film-like morphology, similar to the electrochemically tested devices that were cycled at high current densities.

Referring again to FIG. 1, at 110, the energy storage device is returned to cycling at the operating current density. In some embodiments, self-heating step 106 (and as a result smoothing step 108) is performed every about 25 to about 150 standard operating cycles, e.g., cycling step 104, to prolong the service life of the energy storage device. In some embodiments, self-heating step 106 (and as a result smoothing step 108) is performed every about 50 cycles.

Methods of the present disclosure are advantageous as a simple process for prolonging the service life of metal-ion batteries, and further enabling the use of alkali-metal electrodes in those batteries. Metal-ion batteries operated in the manner described in the embodiments of the present disclosure result in smooth and non-dendritic metal anode surfaces, substantially reducing the risk of premature failure attributable to these dendrites, e.g., due to thermal runaway caused by electrical shorting. Further, as discussed above, dendrite formation has been a major barrier to the use of metallic anodes energy storage devices such as Li-ion batteries. Thus, the implementation of the methods of the present disclosure enable practical application of metallic anodes and the associated advantages, such as batteries with higher energy capacities and lower electrochemical potentials.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of prolonging service life of an energy storage device, comprising:
   providing an energy storage device, the energy storage device including an anode and a cathode;
   cycling the energy storage device at an operating current density;
   operating the energy storage device at a healing current density to generate heat, the healing current density being greater the operating current density;
   smoothing one or more dendrites on a surface of the anode via the heat; and
   returning the energy storage device to cycling at the operating current density.

2. The method according to claim 1, wherein the operating current density is below about 4.5 mA cm$^{-2}$, and the healing current density is above about 4.5 mA cm$^{-2}$.

3. The method according to claim 1, wherein the healing current density is above about 9 mA cm$^{-2}$.

4. The method according to claim 1, wherein the healing current density is above about 12 mA cm$^{-2}$.

5. The method according to claim 1, wherein operating the energy storage device at a healing current density to generate heat has a duration greater than about 1 hour.

6. The method according to claim 5, wherein operating the energy storage device a healing current density to generate heat has a duration between about 2 hours and about 3 hours.

7. The method according to claim 1, wherein the anode is a metal anode.

8. The method according to claim 7, wherein the metal anode is composed of an alkali metal.

9. The method according to claim 8, wherein the alkali metal is lithium, sodium, potassium, or combinations thereof.

10. The method according to claim 1, wherein the cathode is an alkali metal oxide composite cathode or a carbon-sulfur composite cathode.

11. The method according to claim 10, wherein the alkali metal oxide composite cathode is an alkali-metal-iron-phosphate composite cathode, alkali-metal-cobalt-oxide composite cathode, alkali-metal-manganese-oxide composite cathode, alkali-metal-nickel-manganese-cobalt composite cathode, alkali-metal-nickel-cobalt-aluminum-oxide composite cathode, alkali-metal-titanate composite cathode, or combinations thereof.

12. A method of healing an anode of an energy storage device, comprising:
    providing an energy storage device, the energy storage device including an alkali metal anode;
    cycling the energy storage device at an operating current density; and
    cycling the energy storage device at a healing current density for a duration to heat a surface of the anode and smooth one or more dendrites on the surface, the healing current density being greater the operating current density.

13. The method according to claim 12, wherein the alkali metal is lithium, sodium, potassium, or combinations thereof.

14. The method according to claim 12, wherein the operating current density is below about 4.5 mA cm$^{-2}$, and the healing current density is above about 4.5 mA cm$^{-2}$.

15. The method according to claim 14, wherein the healing current density is above about 9 mA cm$^{-2}$.

16. The method according to claim 15, wherein the healing current density is above about 12 mA cm$^{-2}$.

17. The method of according to claim 12, wherein the duration is greater than about 1 hour.

18. The method according to claim 17, wherein the duration is about 2 hours to about 3 hours.

19. The method according to claim 12, wherein the energy storage device includes a cathode, wherein the cathode is an alkali metal oxide composite cathode or a carbon-sulfur composite cathode.

20. The method according to claim 19, wherein the alkali metal oxide composite cathode is an alkali-metal-iron-phosphate composite cathode, alkali-metal-cobalt-oxide composite cathode, alkali-metal-manganese-oxide composite cathode, alkali-metal-nickel-manganese-cobalt composite cathode, alkali-metal-nickel-cobalt-aluminum-oxide composite cathode, alkali-metal-titanate composite cathode, or combinations thereof.

* * * * *